United States Patent
Choi et al.

(10) Patent No.: US 11,848,598 B2
(45) Date of Patent: Dec. 19, 2023

(54) END COIL COOLING STRUCTURE FOR AN INDUCTION MOTOR

(71) Applicants: HYUNDAI MOTOR COMPANY, Seoul (KR); KIA CORPORATION, Seoul (KR); IUCF-HYU (Industry-University Cooperation Foundation Hanyang University), Seoul (KR)

(72) Inventors: Jin Ho Choi, Suwon-si (KR); Sang Jin Park, Hwaseong-si (KR); Soo Hwan Park, Seoul (KR); Kyoung Soo Cha, Seoul (KR); Jae Hyun Kim, Seoul (KR); Myung Seop Lim, Seoul (KR); Sung Woo Hwang, Seoul (KR)

(73) Assignees: HYUNDAI MOTOR COMPANY, Seoul (KR); KIA CORPORATION, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 0 days.

(21) Appl. No.: 17/850,396

(22) Filed: Jun. 27, 2022

(65) Prior Publication Data
US 2023/0170764 A1    Jun. 1, 2023

(30) Foreign Application Priority Data
Nov. 30, 2021 (KR) .......................... 10-2021-0169475

(51) Int. Cl.
*H02K 9/22* (2006.01)
*H02K 7/00* (2006.01)
*H02K 17/02* (2006.01)

(52) U.S. Cl.
CPC ................ *H02K 9/22* (2013.01); *H02K 7/00* (2013.01); *H02K 17/02* (2013.01)

(58) Field of Classification Search
None
See application file for complete search history.

(56) References Cited

U.S. PATENT DOCUMENTS 7,701,096 B2 *  4/2010  Noda .................... B60L 3/0061
                                                      310/57
7,948,126 B2 *  5/2011  Fulton ..................... F28F 3/04
                                                      310/64
(Continued)

FOREIGN PATENT DOCUMENTS

CN        103795189 A         5/2014
DE        19749108 C5 *       6/1997
(Continued)

OTHER PUBLICATIONS

DE-19749108-C5, Sopp, all pages (Year: 1997).*
(Continued)

*Primary Examiner* — Naishadh N Desai
(74) *Attorney, Agent, or Firm* — LEMPIA SUMMERFIELD KATZ LLC

(57) ABSTRACT

An end coil cooling structure includes: a shielding member which is disposed within a motor housing, surrounds an area where an end coil is disposed, and forms an enclosed space; and a plurality of heat conducting particles disposed to fill the enclosed space and to come into contact with the end coil.

9 Claims, 3 Drawing Sheets

(56) References Cited

U.S. PATENT DOCUMENTS

| | | | |
|---|---|---|---|
| 8,148,858 B2 * | 4/2012 | Hassett | H02K 9/18 |
| | | | 310/58 |
| 8,154,158 B2 * | 4/2012 | Saban | H02K 9/12 |
| | | | 310/64 |
| 9,306,428 B2 * | 4/2016 | Hossain | H02K 9/223 |
| 10,141,798 B2 * | 11/2018 | Rogginger | H02K 1/20 |
| 2002/0089244 A1 * | 7/2002 | Liang | H02K 9/223 |
| | | | 310/64 |
| 2008/0223557 A1 * | 9/2008 | Fulton | F28F 3/12 |
| | | | 361/677 |
| 2010/0138127 A1 * | 6/2010 | Boughtwood | B60L 7/16 |
| | | | 310/195 |
| 2011/0304227 A1 * | 12/2011 | Bradfield | H02K 5/203 |
| | | | 310/52 |
| 2011/0304228 A1 * | 12/2011 | Bradfield | H02K 5/18 |
| | | | 29/596 |
| 2014/0077635 A1 * | 3/2014 | Hossain | H02K 15/12 |
| | | | 310/64 |

FOREIGN PATENT DOCUMENTS

| | | | |
|---|---|---|---|
| DE | 102012219859 A1 | | 4/2014 |
| EP | 1600253 A2 * | | 11/2005 |
| JP | H0946975 A | | 2/1997 |
| JP | H0951656 A | | 2/1997 |
| JP | 2017153230 A | | 8/2017 |
| KR | 20170088708 A * | | 10/2017 |
| WO | WO-9732321 A1 * | | 9/1997 |

OTHER PUBLICATIONS

EP-1600253-A2, Meyer, all pages (Year: 2005).*
WO-9732321-A1, BUske, all pages (Year: 1997).*
KR-20170088708-A, Kim et al. all pages (Year: 2017).*

* cited by examiner

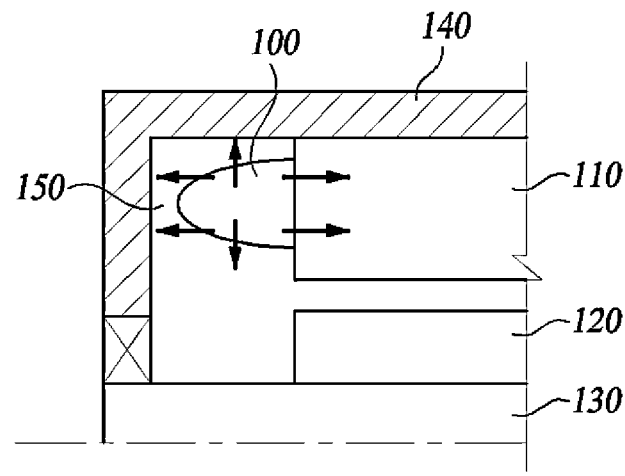
FIG. 1 "PRIOR ART"
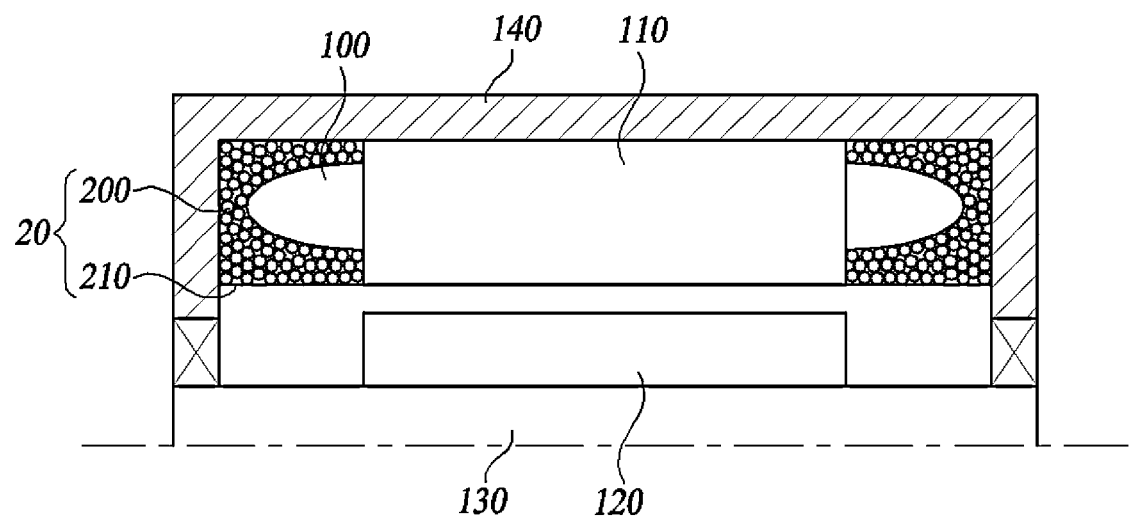
FIG. 2

END COIL COOLING STRUCTURE FOR AN INDUCTION MOTOR

CROSS-REFERENCE TO RELATED APPLICATION

This application claims priority to and the benefit of Korean Patent Application No. 10-2021-0169475, filed on Nov. 30, 2021, the disclosure of which is incorporated herein by reference in its entirety.

TECHNICAL FIELD

The present disclosure relates to an end coil cooling structure for an induction motor.

BACKGROUND

The description in this section merely provides background information related to the present disclosure and does not necessarily constitute the prior art.

A motor's power-to-weight ratio is one of the key performances of electric motors for driving vehicles. A motor for a vehicle needs to be compact and produce high output, in order to achieve desired travel distance and power output. In order to increase the motor's output, the current density of an armature needs to be increased. However, the increase in current density increases losses and heat generation in the armature. Suppressing heat generation greatly affects motor performance, especially in the case of induction motors.

A motor's main source of heat generation is an armature winding, and an end coil exposed to both sides of a stator winding in an induction motor is known to be not easy to cool and generate the most heat (see FIG. 1).

Heat generated from the armature winding making direct contact with a stator core may be released easily through a motor housing by heat transfer. However, structurally, it is tricky to release heat from the end coil by heat conduction, and heat is released mostly by natural convection, which leads to very low cooling efficiency.

Notably, the end coil is considered to have a different shape for each motor because of its structure and manufacturing characteristics. Due to this, there are known methods of cooling the end coil, for example, a method in which direct cooling is done by allowing or spraying refrigerant into the end coil. In another method, a member (e.g., a metal pin, a metal plate, etc.) for conductive heat transfer or a cooling pipe for passing refrigerant through is plastically deformed so as to come into contact with and tightly bind to an assembled end coil.

In the method of directly spraying refrigerant, the refrigerant may penetrate into air gaps as it moves along the rotor, and the viscosity of the refrigerant may cause torque loss. Moreover, the refrigerant circulation method is disadvantageous in that it has low assemblability, requires the addition of a cooling system, and makes maintenance and repair difficult.

Meanwhile, coil windings providing a plurality of poles arranged in a circumferential direction of the stator are not uniformly cooled, which may cause a temperature difference. This may vary the resistance in the windings and produce errors in a generated magnetic flux, thereby lowering control precision. To address this, we have found that a reservoir may be provided and filled with a predetermined volume of refrigerant or more in the circumferential direction in order to lower the degree of cooling nonuniformity. However, it is hard to achieve uniform cooling by using the method of directly spraying refrigerant into the end coil, and this may result in lowering control precision.

SUMMARY

The present disclosure provides a cooling structure for cooling the heat generation of the end coil of the induction motor.

According to one embodiment of the present disclosure, an end coil cooling structure comprises: a shielding member within a motor housing and configured to: surround an area where an end coil is disposed, and form an enclosed space; and a plurality of heat conducting particles disposed to fill the enclosed space and configured to come into contact with the end coil.

An end coil cooling structure according to the present disclosure has the effect of improving the performance of induction motors by effectively cooling an end coil region having an inconsistent shape. In particular, the end coil colling structure comprises heat conducting particles that fill the vicinity of the end coil in an unspecified pattern and/or a non-moving/moving refrigerant injected to impregnate the heat conducting particles with, and/or a cooling pipe.

BRIEF DESCRIPTION OF THE DRAWINGS

In order that the disclosure may be well understood, there will now be described various forms thereof, given by way of example, reference being made to the accompanying drawings, in which:

FIG. 1 illustrates an end coil of a typical motor stator;

FIG. 2 illustrates an end coil cooling structure comprising heat conducting particles according to an embodiment of the present disclosure;

Figure 3:
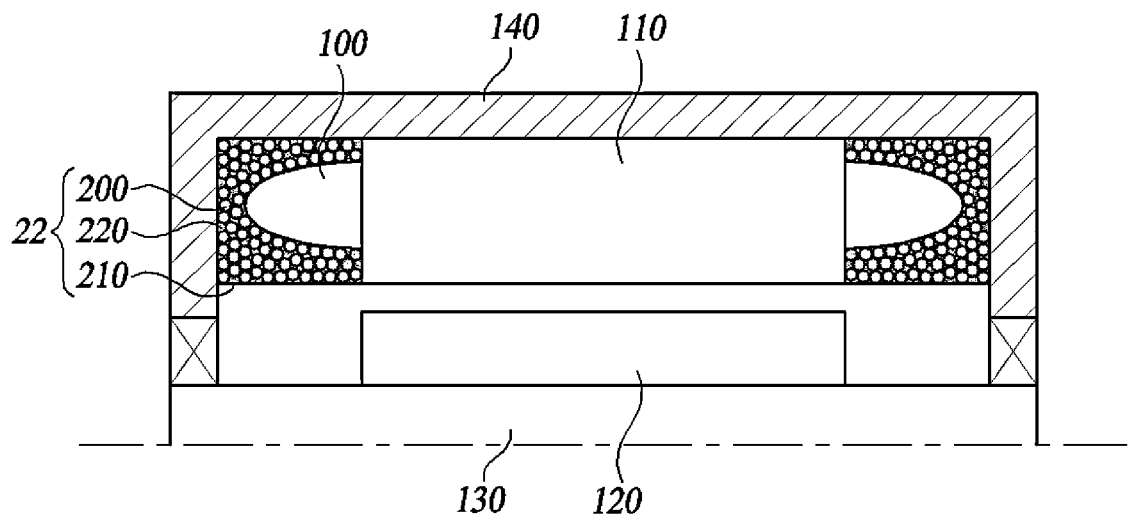
FIG. 3 illustrates an end coil cooling structure comprising heat conducting particles and a non-moving refrigerant according to a second embodiment of the present disclosure.

The drawings described herein are for illustration purposes only and are not intended to limit the scope of the present disclosure in any way.

DETAILED DESCRIPTION

Some embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein are omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

When a component, device, element, or the like of the present disclosure is described as having a purpose or performing an operation, function, or the like, the component, device, or element should be considered herein as being "configured to" meet that purpose or to perform that operation or function.

FIG. 2 illustrates an end coil cooling structure comprising heat conducting particles according to an embodiment of the present disclosure.

Referring to FIG. 2, an end coil cooling structure 20 according to a first embodiment includes a shielding member 210 configured to surround an area 150 where an end coil 100 of a stator core 110 is disposed and to form an enclosed space, and heat conducting particles 200 filling the enclosed space.

Referring back to FIG. 1, the end coil 100 is disposed to protrude from both sides of the stator core 110. The end coil 100 may have a slightly different shape for each motor to be manufactured. Also, the end coil 100 is usually placed in an area exposed to air and therefore cooled by convection alone, unlike the inside of the stator core 110 where a temperature rise is suppressed by heat transfer by direct contact with the housing 140. Consequently, the end coil 100 is practically the region where temperature increases the most, and it is reasonable to say that the end coil 100 is not kept consistent in shape because of thermal deformation.

One of the key performance factors for a driving motor for a vehicle is the motor's power-to-weight ratio. To increase this ratio, improvements are being made to the performance of power control devices to allow for higher currents and temperatures. Thus, when a higher current is supplied to a stator winding, the motor generates more heat. Excessive heat generation from the end coil 100 lowers the performance and durability of the motor.

The end coil cooling structure 20 according to an embodiment uses the heat conducting particles 200 in order to release heat from the end coil 100 by heat conduction.

The heat conducting particles 200 may be a non-conductive and non-magnetic material. As the heat conducting particles 200, alumina ceramics having a thermal conductivity of 16-29 W/m·K, aluminum nitride (AlN) having a thermal conductivity of 90-170 W/m·K, and the like may be used which are advantageous for heat transfer as compared with the fact that the thermal conductivity of air is 0.025 W/m·K. Besides, any material that is easy to mold into a proper size and has a high thermal conductivity may be used for the end coil cooling structure according to an embodiment.

The heat conducting particles 200 may be spherical particles. The heat conducting particles 200 may have a size enough to move themselves as needed within the area 150 filled with the heat conducting particles 200. That is, the heat conducting particles 200 may have such a size that the heat conducting particles 200 filling the area 150 can be easily varied in shape, so as to bear thermal deformation of the end coil 100. To this end, the heat conducting particles 200 may have monodispersity with size variations within a certain range.

The heat conducting particles 200 may have polydispersity if they are only intended to facilitate heat release by heat transfer while filling the vicinity of the end coil by contact with the end coil. In other words, if the area 150 is packed with both large-diameter particles and small-diameter particles which can properly fill the gaps between the large-diameter particles, the contact area may be maximized to bring advantage for the heat transfer by heat conduction. However, the end coil cooling structure 20 according to an embodiment is constructed to bear thermal expansion of the end coil 100 and avoid mechanical stress on the end coil 100 despite changes in the size and/or shape of the end coil 100 resulting from frequent heating and cooling of the motor. Accordingly, although the heat transfer efficiency may be slightly lower, the heat conducting particles 200 may have monodispersity in order to allow for free deformation and/or movement of the heat conducting particles 200.

FIG. 3 illustrates an end coil cooling structure comprising heat conducting particles and a non-moving refrigerant according to a second embodiment of the present disclosure.

Referring to FIG. 3, the end coil cooling structure 22 according to the second embodiment further comprises a refrigerant that fills gaps 220 formed between the heat conducting particles 200 filling the area 150. The refrigerant may be injected to fill the area 150 after the area 150 is filled with the heat conducting particles 200. The refrigerant may improve the heat transfer by heat conduction between the end coil 100, the heat conducting particles 200, and the housing 140 around the area 150.

The refrigerant also may act as lubricant between the heat conducting particles 200 in physical contact with each other, such that particle breakage or particulate fallout caused by collision between the heat conducting particles 200 can be avoided. To this end, the refrigerant according to an embodiment may further include a predetermined lubricant component. Also, the heat conducting particles 200 may be made nearly spherical in order to reduce or minimize wear.

Figure 4:
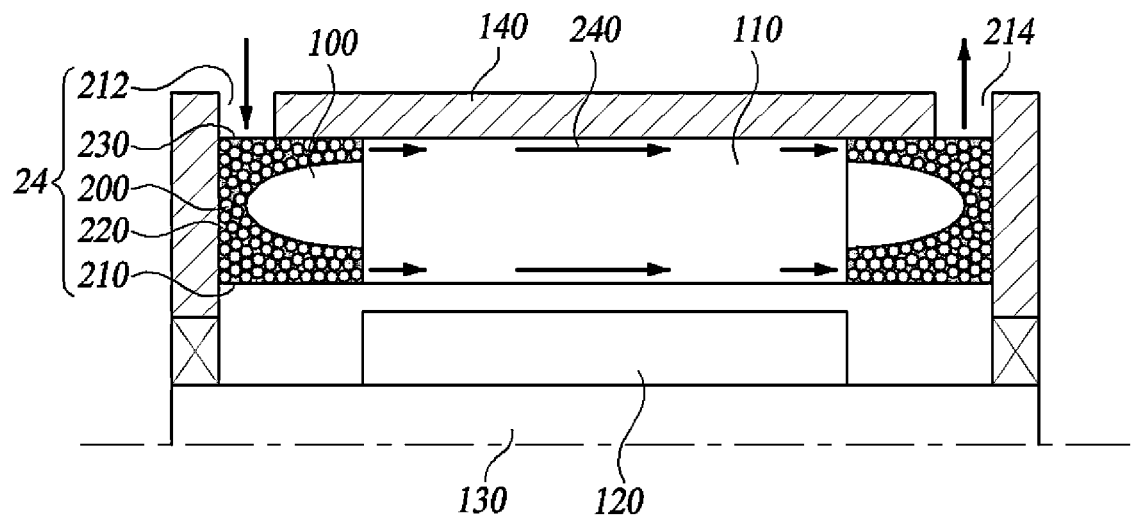
FIG. 4 illustrates an end coil cooling structure comprising heat conducting particles and a moving refrigerant according to a third embodiment of the present disclosure.

FIG. 4 illustrates an end coil cooling structure comprising heat conducting particles and a moving refrigerant according to a third embodiment of the present disclosure.

Referring to FIG. 4, the end coil cooling structure 24 according to the third embodiment may be constructed in such a way that a refrigerant is supplied to one side 212 of the area 150 filled with the heat conducting particles 200 via the motor housing 140, and that the refrigerant is released from the other side 214. The refrigerant absorbs heat as it passes through the vicinity of the heat conducting particles 200, is cooled in a cooling apparatus (not shown) disposed outside the motor housing 140, and is then supplied back to the area 150.

In the example illustrated in FIG. 4, the refrigerant moves past the area 150 at one end of the end coil 100, penetrates and flows through the stator core 110 in an axial direction, enters the area 150 at the other end of the end coil 100, and is then released out of the motor housing 140 and transferred to the cooling apparatus. The third embodiment is not limited to what is illustrated in the drawing, and the refrigerant may flow through the area 150 at one end of the end coil 100 and the area 150 at the other end of the end coil 100, without penetrating and flowing through the stator core 110.

In the third embodiment, the heat conducting particles 200 may be large enough to facilitate the movement of the refrigerant. In other words, the heat conducting particles 200 may have a size that can provide gaps sufficient for the movement of the refrigerant while filing the area 150.

Figure 5:
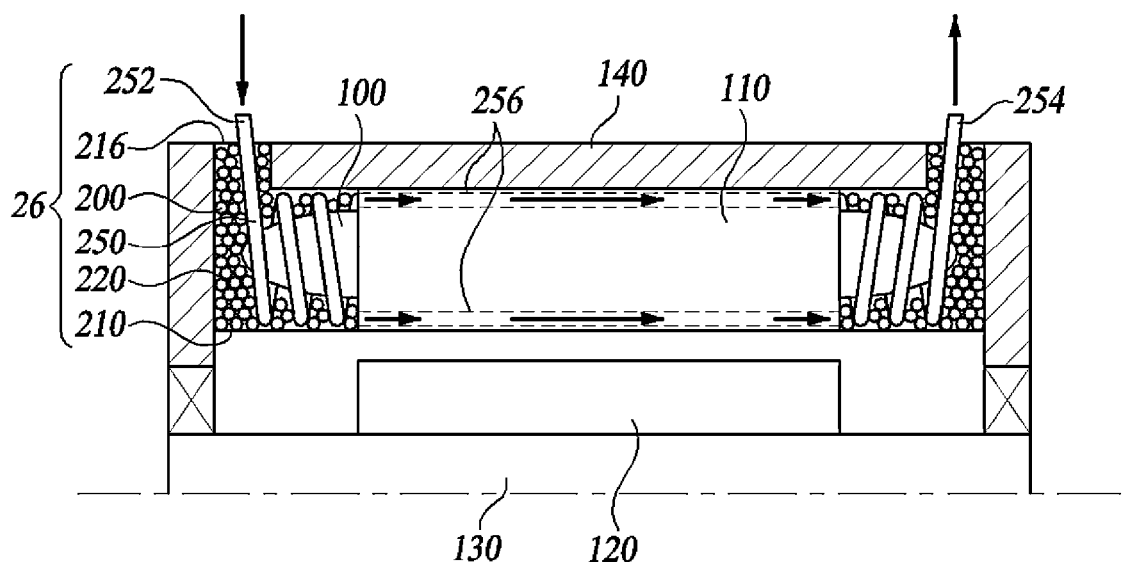
FIG. 5 illustrates an end coil cooling structure comprising heat conducting particles and a refrigerant flow pipe according to a fourth embodiment of the present disclosure.

FIG. 5 illustrates an end coil cooling structure comprising heat conducting particles and a refrigerant flow pipe according to a fourth embodiment of the present disclosure.

The end coil cooling structure 26 according to the fourth embodiment shows an example of having a refrigerant pipe 250 to inhibit or prevent refrigerant leakage.

Referring to FIG. 5, refrigerant is supposed to only flow through a separate refrigerant pipe 250. The refrigerant pipe 250 is provided and configured to be adjacent to the end coil 100, and the heat conducting particles 200 fill the vicinities of the end coil 100 and the refrigerant pipe 250. Also, the refrigerant pipe 250 may be configured to penetrate the inside of the stator core 110 in an axial direction. The refrigerant pipe 250 may be connected to a cooling apparatus disposed outside the motor housing 140 and discharge heat generated from the end coil 100.

At least part of the refrigerant pipe 250 may be configured to come into direct contact with the end coil 100. Also, the refrigerant pipe 250 may be a structure and/or material that causes a portion contacting the end coil 100 to be elastically deformed so as to bear thermal deformation of the end coil 100. However, the refrigerant pipe 250 is not limited to such a structure and/or material, and the refrigerant pipe 250 and the end coil 100 may be configured to have the heat conducting particles 200 fill the space between them without contacting each other.

On the other hand, the area 150 may be fully filled with the heat conducting particles 200, or, in some cases, part of the area 150 may remain empty without them. The pattern in which the heat conducting particles 200 fill the area 150 may be frequently changed due to vibrations accompanying motor rotation and vehicle driving. Accordingly, the heat conducting particles 200 may constantly bind tightly around the end coil.

Meanwhile, in the end coil cooling structure 20, 22, 24, and 26 according to the embodiments of the present disclosure, the heat conducting particles 200 only serve to fill the area 150 but they do not bind to one another, which is an advantage when it comes to the maintenance and repair of motors and recycling materials from waste motors.

Although exemplary embodiments of the present disclosure have been described for illustrative purposes, those having ordinary skill in the art will appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, one of ordinary skill in the art would understand that the scope of the present disclosure is not to be limited by the above explicitly described embodiments but should include equivalents thereof.

What is claimed is:

1. An end coil cooling structure comprising:
   a shielding member within a motor housing and configured to: surround an area where an end coil is disposed, and form an enclosed space; and
   a plurality of heat conducting particles disposed to fill the enclosed space and configured to come into contact with the end coil,
   wherein the plurality of heat conducting particles have a spherical shape and monodispersity in size and are configured not to be bonded to each other,
   wherein the plurality of heat conducting particles are configured to have a size to be movable while filling the area and do not fully fill the enclosed space but leave part of the enclosed space empty such that a shape filled with the heat conducting particles is configured to be deformed.

2. The end coil cooling structure of claim 1, wherein the heat conducting particles are alumina ceramics or aluminum nitride (AlN).

3. The end coil cooling structure of claim 1, further comprising a refrigerant that fills the enclosed space and gaps between the heat conducting particles.

4. The end coil cooling structure of claim 3, wherein the refrigerant comprises a lubricant component to inhibit breakage due to wear of the heat conducting particles.

5. The end coil cooling structure of claim 1, wherein:
   the motor housing comprises an inlet and an outlet formed to provide a fluid connection to the enclosed space so as to circulate refrigerant,
   a cooling apparatus in fluid communication with the inlet and the outlet is disposed on an outside of the motor housing, and
   the cooling apparatus is configured to release heat after the refrigerant moves through the enclosed space.

6. The end coil cooling structure of claim 5, wherein the refrigerant penetrates and flows through an inside of a stator core.

7. The end coil cooling structure of claim 1, further comprising: a refrigerant pipe disposed in the enclosed space and configured to provide a fluid connection to a cooling apparatus disposed on an outside of the motor housing.

8. The end coil cooling structure of claim 7, wherein the refrigerant pipe is configured to penetrate an inside of a stator core.

9. The end coil cooling structure of claim 7, wherein at least part of the refrigerant pipe is configured to come into direct contact with the end coil and to bear thermal deformation of the end coil.

* * * * *